United States Patent
Saito et al.

(10) Patent No.: US 7,785,009 B2
(45) Date of Patent: Aug. 31, 2010

(54) SLIDE GUIDING DEVICE

(75) Inventors: Toshiyuki Saito, Toyoake (JP);
Toshikazu Sakei, Toyoake (JP); Tomio Aso, Tokai (JP); Youji Hamajima, Obu (JP)

(73) Assignee: JTEKT Corporation, Osaka-shi (JP)

( * ) Notice: Subject to any disclaimer, the term of this patent is extended or adjusted under 35 U.S.C. 154(b) by 1020 days.

(21) Appl. No.: 10/592,951

(22) PCT Filed: Mar. 18, 2005

(86) PCT No.: PCT/JP2005/005602

§ 371 (c)(1),
(2), (4) Date: Sep. 15, 2006

(87) PCT Pub. No.: WO2005/106267

PCT Pub. Date: Nov. 10, 2005

(65) Prior Publication Data

US 2007/0201775 A1    Aug. 30, 2007

(30) Foreign Application Priority Data

Apr. 28, 2004    (JP)    ............................... 2004-133252

(51) Int. Cl.
*F16C 32/06*    (2006.01)
(52) U.S. Cl. ........................................................ 384/12
(58) Field of Classification Search .................... 384/12
See application file for complete search history.

(56) References Cited

U.S. PATENT DOCUMENTS

| 1,940,301 A |  | 12/1933 | Grobel et al. |  |
|---|---|---|---|---|
| 3,680,932 A |  | 8/1972 | Raimondi |  |
| 3,754,799 A | * | 8/1973 | Hedberg | ........................ 384/12 |
| 4,457,566 A | * | 7/1984 | Mohsin | ........................ 384/12 |
| 6,749,378 B2 | * | 6/2004 | Saito et al. | ................... 409/235 |

FOREIGN PATENT DOCUMENTS

| EP | 1 231 392 | 8/2002 |
|---|---|---|
| GB | 1 362 976 | 8/1974 |
| JP | 2001-280343 | 10/2001 |
| JP | 2002-106565 | 4/2002 |
| JP | 2002-239859 | 8/2002 |

\* cited by examiner

*Primary Examiner*—William C Joyce
(74) *Attorney, Agent, or Firm*—Oblon, Spivak, McClelland, Maier & Neustadt, L.L.P.

(57) ABSTRACT

A slide guiding device in a machine tool includes slide guiding surfaces provided on a bed, sliding surfaces provided on a column, which is guided on the bed for movement on the same, and movable on the slide guiding surfaces, oil grooves each with a first supply hole for supplying lubrication oil to contact surface areas between the sliding surfaces and the slide guiding surfaces, and oil pockets formed independently of the oil grooves for retaining the lubrication oil supplied to the contact surface areas between the sliding surfaces and the slide guiding surfaces.

8 Claims, 4 Drawing Sheets

SLIDE GUIDING DEVICE

TECHNOLOGICAL FIELD

The present invention relates to a slide guiding device for a movable slide as used in machine tools or the like. Particularly, it relates to a slide guiding device which is capable of keeping the lost motion of the movable slide in a proper state by effectively suppressing the occurrence of the lack of lubrication oil even where the time interval for lubrication oil supply is lengthened.

BACKGROUND ART

Heretofore, as a slide guiding device for a movable slide as used in machine tools or the like, there has been known one which is provided with a slide guiding surface formed on a support member such as bed or the like and a sliding surface which is formed on a movable slide such as column, saddle, spindle head or the like to be slidable on the slide guiding surface.

In the slide guiding device, the sliding surface has formed thereon oil grooves each with a supply hole for supplying lubrication oil to a contact surface area between the slide guiding surface and the sliding surface, and the lubrication oil is supplied over the whole of the contact surface area by supplying the lubrication oil to the oil grooves, so that sliding resistance can be reduced between the slide guiding surface and the sliding surface.

The aforementioned background art is a conventional art, and the inventors of this application have not known any particular reference which describes a background art relevant to the present invention.

In the aforementioned conventional slide guiding device, the lubrication oil supplied from the oil grooves of the sliding surface flows out of the sliding surface and the slide guiding surface to decrease at these surfaces as the sliding surface is slidden on the slide guiding surface. Thus, the lack of the lubrication oil takes place at a contact surface area between the sliding surface and the slide guiding surface. This causes the slide guiding device to generate many lost motions, whereby a problem arises in that there take place deterioration in the feed accuracy of the slide guiding device and excessive abrasion or wear of either or both of the sliding surface and the slide guiding surface. To avoid this, it has been a practice that an additional oil supply facility for supplying lubrication oil is provided to supply lubrication oil of a predetermined quantity at a predetermined time interval or each time of a predetermined number of sliding motions so that the lack of the lubrication oil is prevented from taking place.

However, in order to prevent the lack of the lubrication oil from taking place in the slide guiding device, it has been a practice to cope with the aforementioned problem by shortening the time interval for lubrication oil supply or increasing the oil quantity per supply operation. This gives rise to problems that an oil reservoir for storing the lubrication oil has to be made to be large due to an increase in consumption of the lubrication oil and that the oil supply facility is unavoidable to be enlarged in dimension with a resultant increase in a space to install the oil supply facility. Besides, another problem arises in that an increase in the lubrication oil consumption causes an increase in the running cost for the slide guiding device.

To avoid this, it may be conceived to lower the running cost and to downsize the oil supply facility by lengthening the time interval for lubrication oil supply to reduce the lubrication oil consumption. However, lengthening the time interval for lubrication oil supply or decreasing the oil quantity per supply operation results in an additional problem that the lack of the lubrication oil becomes liable to take place.

To cope with this problem, as shown in FIG. 6, there have been proposed various kinds of lubrication oils whose ingredients are mixed so that the lack of the lubrication oil hardly takes place even where the time interval for lubrication oil supply is lengthened. In a machine tool for precise machining, it is desirable to make the lost motion in a slide guiding device as small as less than 10 μm (ten micron meters). Even where there was used any lubrication oil which meets the requirement, the supply time interval had to be set as short as about two and half (2.5) minutes, and the consumption of the lubrication oil could not be reduced, whereby it was unable to solve the problem which caused an increase in the running cost.

Generally, in conventional slide guiding devices, when a sliding surface being stationary on a slide guiding surface begins to slide, the state of friction is changed from static friction to dynamic friction, whereupon a feed device for driving a sliding surface is slightly deformed, and the slight deformation of the feed device causes the lost motion in the sliding movement of a movable slide. There is an inclination that the larger the friction resistance becomes, the larger the amount of the lost motion becomes. Further, the lost motion is generated by a backlash such as a play in the feed device.

On the other hand, where a scraper finishing by manual work of a skilled worker is carried out on the slide guiding surface and the sliding surface, a fine uneven surface which is unable to machine by machining can be formed on each of the slide guiding surface and the sliding surface, so that it can be realized to make lubrication oil remain on the slide guiding surface and the sliding surface for a long period of time. However, this needs not only the manual work of the skilled worker but also many man-hours for the work, thereby resulting in a substantial increase in the manufacturing cost for the slide guiding device.

DISCLOSURE OF THE INVENTION

It is an object of the present invention to provide an improved slide guiding device, as used in a machine tool, capable of effectively suppressing the occurrence of the lack of lubrication oil even where the lubrication oil supplied to a contact surface area between a slide guiding surface and a sliding surface is supplied at a long time interval or is reduced in the supply quantity, so that the amount of lost motion is decreased to prevent an excessive abrasion or wear.

In order to accomplish the foregoing object, a slide guiding device according to the present invention comprises a slide guiding surface provided on a support member, a sliding surface provided on a movable slide, which is movable to be guided on the slide guiding surface, and movable on the slide guiding surface, an oil groove with a first supply hole for supplying lubrication oil to a contact surface area between the sliding surface and the slide guiding surface, and an oil pocket formed independently of the oil groove for retaining the lubrication oil supplied to the contact surface area between the sliding surface and the slide guiding surface.

The oil groove and the oil pocket may be provided either on the slide guiding surface or on the sliding surface, may be provided on the same surface, or may be provided respectively on both of the surfaces. The slide guiding surface and the sliding surface may be arranged to lie in an approximately horizontal plane, an approximately vertical plane or a slant plane. Further, the slide guiding surface and the sliding surface are of the arrangement that the sliding surface is at the upper side of the slide guiding surface or at the lower side of the slide guiding surface.

Although no particular limitation is imposed on the plane shape (i.e., two-dimensional shape) of the oil pocket, the shape of a lateral wall connecting a contact surface to a bottom surface of the oil pocket is desired to take a straight shape or arc shape in cross-section and is sufficient to take a shape which is likely to lead the lubrication oil on the contact surface into the oil pocket. Where a symbol $h1$ is given to indicate the distance between both contact surfaces and another symbol $h2$ is given to indicate the distance from the other contact surface to the bottom surface of the oil pocket as shown in FIG. 3, the ratio $h2/h1$ is desired to be within a range of 1.5 to 2. This is because the lubrication oil is liable to flow out of the oil pocket and not to be retained in the same for a long period of time where the ratio $h2/h1$ is set to be smaller than 1.5 and because the lubrication oil becomes hard to be retained in the oil pocket where the ratio $h2/h1$ is set to be greater than 2.

In the slide guiding device according to the present invention, the lubrication oil supplied from the first oil hole of the oil groove is supplied to a contact surface area between the slide guiding surface and the sliding surface through the oil groove and then is supplied to the whole of the contact surface area upon the sliding movement of the sliding surface on the slide guiding surface. A part of the supplied lubrication oil flows out of the slide guiding surface and the sliding surface, and the reaming part thereof is retained in the oil pocket which is formed independently of the oil groove. With the sliding movement of the sliding surface on the slide guiding surface, the lubrication oil flows out from the contact surface area, and instead, the lubrication oil retained in the oil pocket is supplied to the contact surface area to maintain the lubrication.

That is, while the lubrication oil in the contact surface area decreases by flowing out from the slide guiding surface and the sliding surface, the lubrication oil retained in the oil pocket is supplied thereto, so that the lack of the lubrication oil is suppressed from taking place in a short period of time. For this reason, even where the time interval at which the lubrication oil is supplied to the oil groove is set to a longer time than in the conventional art or even where the supply quantity of the lubrication oil per supply operation is decreased, the occurrence of the lack of the lubrication oil is suppressed, so that the amount of the lost motion can be kept to a desired proper amount to suppress deterioration in feed accuracy and the occurrence of excessive wear.

Thus, it becomes possible to lengthen the time interval for the lubrication oil to be supplied to the oil groove or to decrease the supply quantity per supply operation, so that the running cost for lubrication can be reduced.

Further, without making a skilled worker do a scraper finishing and only by forming the oil groove and the oil pocket by machining, it becomes possible to maintain the lubrication oil for a long period of time. Therefore, the manual work of the skilled worker is not needed, and this results in substantial reduction of the man-hour and cost for machining.

As described above, according to the present invention, it can be realized to provide a slide guiding device which is used in a machine tool and which is capable of effectively suppressing the occurrence of the lack of lubrication oil even where the time interval at which the lubrication oil is supplied to a contact surface area between a slide guiding surface and a sliding surface is lengthened or even where the supply quantity of the lubrication oil is decreased, so that the lost motion can be diminished and the occurrence of excessive abrasion or wear can be prevented.

MODIFICATIONS OF THE INVENTION

In addition to the aforementioned construction, the slide guiding device in another or second aspect of the present invention may be further provided with air discharge means for discharging air from the oil pocket. The air discharge means may be exemplified as of the type that a hole is formed to discharge the air or of the type that a groove or slot is formed to discharge the air.

According to the present invention in the second aspect, it becomes possible to make the oil pocket easy to be filled up with the lubrication oil by discharging the air from the oil pocket by the air discharge means, and it becomes possible to further lengthen the time interval for lubrication oil supply by increasing the quantity of the lubrication oil retained in the oil pocket.

In addition to the aforementioned construction, the slide guiding device in still another or third aspect of the present invention may be further provided with a second supply hole in the oil pocket for supplying the lubrication oil to the same.

According to the present invention in the third aspect, since the oil pocket is supplied with the lubrication oil through the second supply hole, the lubrication oil is ensured to be retained in the oil pocket even when the lubrication oil from the oil groove is not supplied to the oil pocket.

In addition to the aforementioned construction, the slide guiding device in a further or fourth aspect of the present invention may take a construction that the oil pocket is provided close to an end portion of the contact surface area between the sliding surface and the slide guiding surface.

Around the end portion of the contact surface area between the sliding surface and the slide guiding surface, the lubrication oil is liable to flow out of the sliding surface and the slide guiding surface, and thus, the lubrication oil tends to lack around that portion. Thus, in the fourth aspect of the present invention, the oil pocket is provided close to the end portion to supply the lubrication oil from the oil pocket around the end portion where the lack of the lubrication oil tends to occur, so that it becomes possible to suppress the occurrence of the lack of the lubrication oil.

In the case that the sliding surface and the slide guiding surface are those surfaces lying in an approximately horizontal plane, it is desirable to provide the oil pocket close to each of the opposite ends in the sliding direction of the sliding surface. In the case that the sliding surface and the slide guiding surface are those surfaces lying in an approximately vertical surface or a slant surface, it is desirable to provide the oil pockets close to each of the opposite ends in the sliding direction of the sliding surface as well as to an end portion located at the upper side.

In addition to the aforementioned construction, the slide guiding device in a still further or fifth aspect of the present invention may take a construction that the oil groove, the oil pocket and the air discharge means are provided on the sliding surface.

According to the present invention in the fifth aspect, since the sliding surface which slides on the slide guiding surface is provided with the oil groove, the oil pocket and the air discharge means, the lubrication oil is moved together with the sliding surface, and thus, it can be realized to effectively supply the lubrication oil over the whole area of the slide guiding surface. Further, since the oil groove, the oil pocket and the air discharge means are arranged concentrically on the sliding surface, it can be realized to reduce the man-hour and the cost which are required to provide the oil groove, the oil pocket and the air discharge means. In this case, it is desirable that the sliding surface is arranged to be movable over the slide guiding surface.

PREFERRED EMBODIMENTS TO PRACTICE THE INVENTION

Figure 1:
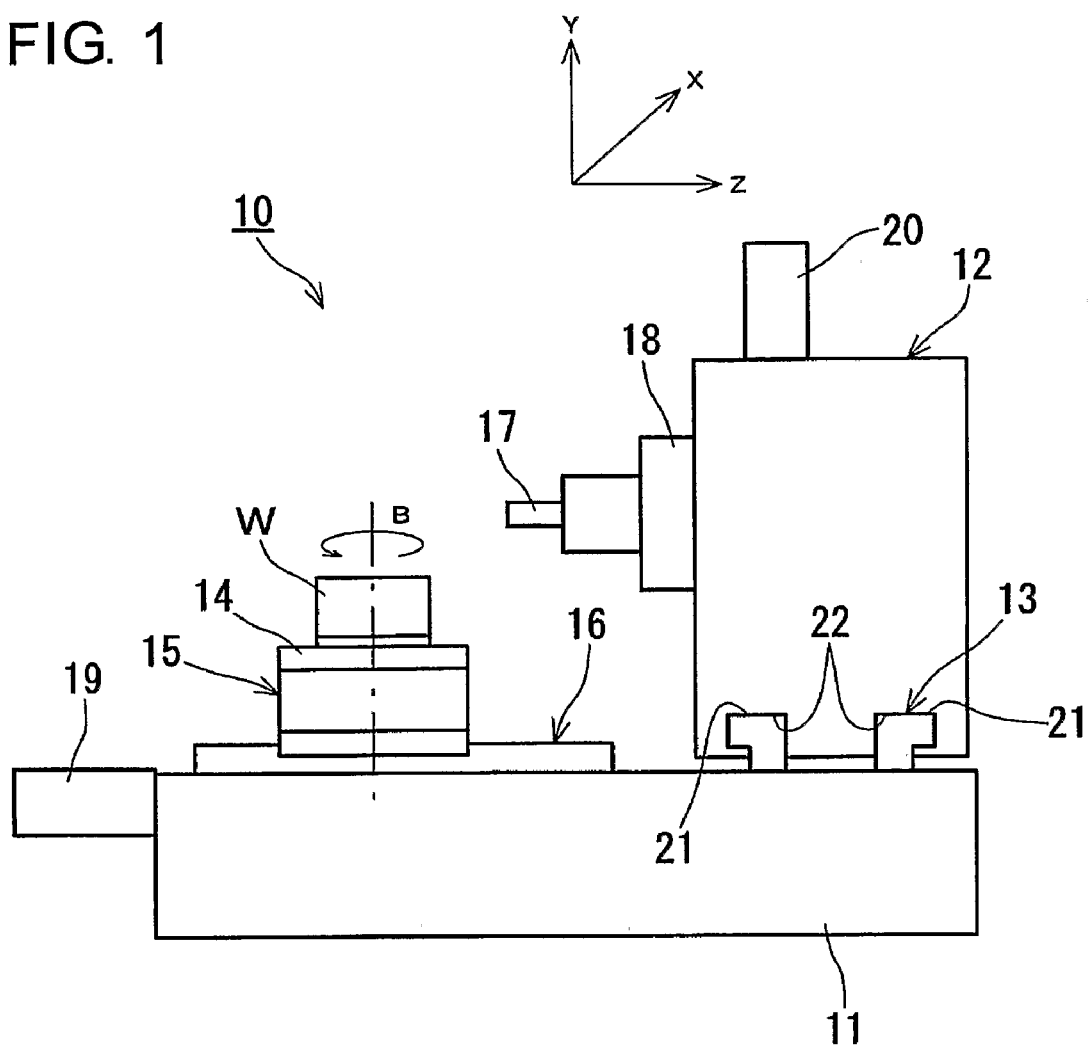
FIG. 1 is a schematic side elevational view of a machine tool to which a slide guiding device according to the present invention is applied.
Figure 2A:
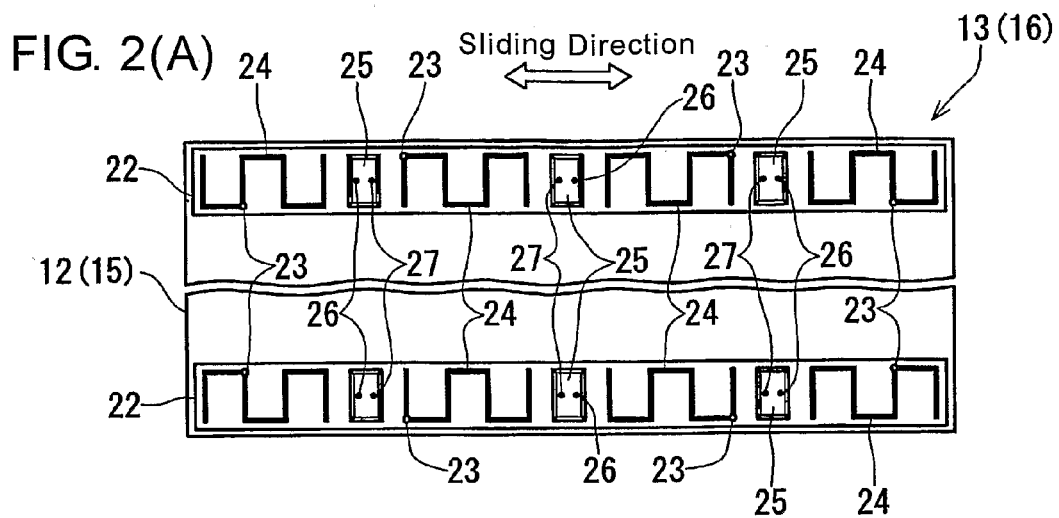
FIG. 2(A) is a schematic bottom surface view of a movable slide having a sliding surface in the slide guiding device according to the present invention.
Figure 2B:
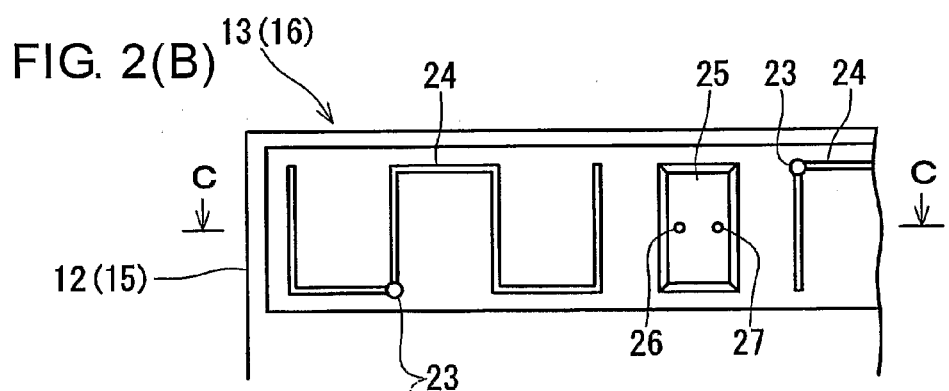
FIG. 2(B) is an enlarged fragmentary view showing a part of the sliding surface in an enlarged scale.
Figure 2C:
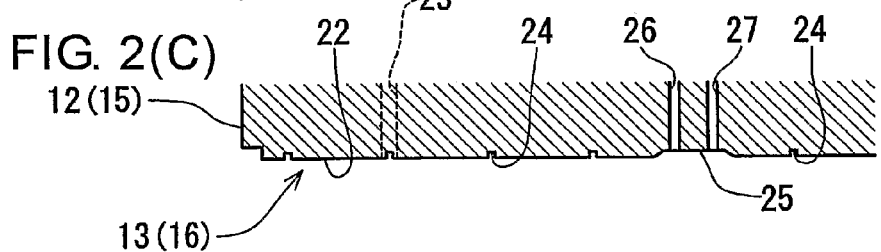
FIG. 2(C) is a sectional view taken along the line C-C in FIG. 2(B)
Figure 2D:
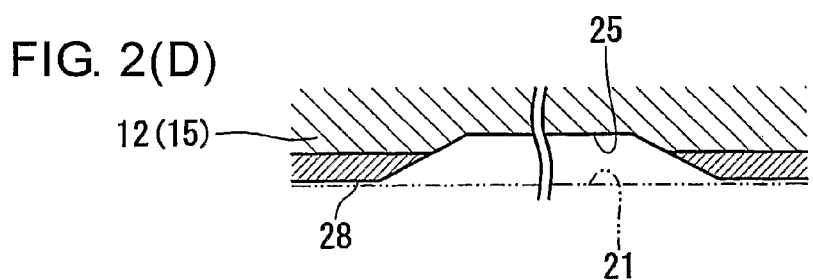
FIG. 2(D) is an enlarged sectional view of an oil pocket.
Figure 3:
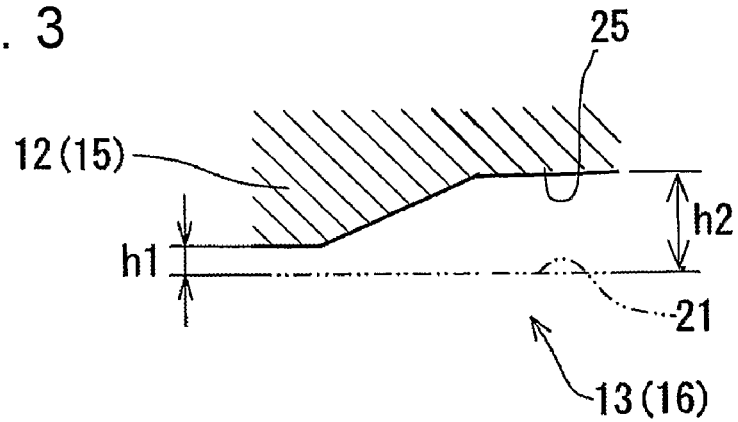
FIG. 3 is an explanatory view showing the feature of a lateral wall shape which is taken by the oil pocket provided in the present invention.

Hereafter, a slide guiding device in a preferred embodiment according to the present invention will be described with reference to FIG. 1 through FIG. 3. FIG. 1 is a schematic side elevational view of a machine tool to which a slide guiding device according to the present invention is applied, FIG. 2(A) is a schematic bottom surface view of a movable slide having a sliding surface in the slide guiding device according to the present invention, FIG. 2(B) is an enlarged fragmentary view showing a part of the sliding surface in an enlarged scale, FIG. 2(C) is a sectional view taken along the line C-C in FIG. 2(B), and FIG. 2(D) is an enlarge sectional view of an oil pocket. Further, FIG. 3 is an explanatory view showing the feature of a lateral wall shape which is taken by the oil pocket provided in the present invention.

Referring now to FIG. 1, a machine tool 10 is shown as machining center wherein four axes including a B-axis in addition to an X-axis, a Y-axis and a Z-axis are numerically controllable by a computer numerical controller (so-called "CNC"). The machine tool 10 is composed of a bed 11 for supporting all components thereof, a slide guiding device 13 for guiding a column 12 mounted on the bed 11 in the X-axis direction and another slide guiding device 16 for guiding a work table 15 in the Z-axis direction. The work table 15 is also mounted on the bed 11 and supports thereon a rotary table 14 which is rotatable about the B-axis.

The column 12 is provided thereon with another slide guiding device (not shown) by which a spindle head 18 having a tool 17 attached thereto is guided in the Y-axis direction. Each of the column 12, the work table 15 and the spindle head 18 in the present embodiment corresponds to a movable slide in the present invention, and each of the bed 11 and the column 12 in the present embodiment corresponds to a support member in the present invention.

The machine tool 10 is further provided with drive means (not shown) for moving the column 12 in the X-axis direction, another drive means 19 for moving the work table 15 in the Z-axis direction, and another drive means 20 for moving the spindle head 18 in the Y-axis direction. Also in FIG. 1, a symbol W denotes a workpiece to be machined which is mounted on the rotary table 14. As well known in the art, each of the drive means is composed of a servomotor and a ball-screw feed mechanism which is drivingly connected to an associated movable slide (i.e., the column 12, the work table 15 or the spindle head 18) upon rotation of the servomotor. Of course, a linearmotor drive may be employed for either or each of the drive means in substitution for the drive composed of the servomotor and ball-screw feed mechanism.

The slide guiding devices 13 and 16 take substantially the same construction, and therefore, the slide guiding device 13 will be typically described hereinafter also on behalf of the slide guiding device 16 which will be omitted from being described. As shown in FIGS. 1 and 2(A), the slide guiding device 13 is provided with a pair of slide guiding surfaces 21 which are formed on the bed 11 to extend in the X-axis direction and a pair of sliding surfaces 22 which are formed on the bottom portion of the column 12 to be slidable on the slide guiding surfaces 21.

Each of the sliding surfaces 22 of the slide guiding device 13 has formed thereon plural (four in the illustrated embodiment) oil grooves 24 each with a first supply hole 23 for supplying lubrication oil to a contact surface area between the sliding surface 22 and the slide guiding surface 21 and plural (three in the illustrated embodiment) oil pockets 25 formed independently of the oil grooves 24 for retaining the lubrication oil supplied to the contact surface area. Needless to say, the numbers of the oil grooves 24 and the oil pockets 25 depend primarily on the length of each sliding surface 22, and each sliding surface 22 may be provided thereon with one oil groove 24 and one oil pocket 25 as the case may be.

As shown in FIGS. 2(B) and 2(C) in an enlarged scale, each of the oil grooves 24 is machined so that a groove having a predetermined width and a predetermined depth takes a crank shape, and the four oil grooves 24 are independently arranged in the sliding direction. Each of the oil grooves 24 is provided with one first supply hole 23. The first supply hole 23 of each of the oil grooves 24 which are arranged at opposite end portions in the sliding direction is provided on a second groove segment as counted from a corresponding end portion of the sliding surface 22, of four groove segments which extend in a direction normal to the sliding direction.

In this particular embodiment, each oil groove 24 is designed to be about 1 millimeter in width and about 1.2 millimeters in depth. The depth is desirable to be within a range of 1 to 1.5 millimeters and may be properly set together with the width.

The oil pockets 25 being rectangular in two-dimensional shape are arranged with each being between two adjoining oil grooves 24. In this particular embodiment, three oil pockets 25 are provided on each of the sliding surfaces 22 as mentioned earlier. Each of the oil pockets 25 is provided therein with a discharge hole 26 for discharging air from the oil pocket 25 and a second supply hole 27 for supplying lubrication oil into the oil pocket 25. The discharge hole 26 in this particular embodiment corresponds to air discharge means in the present invention.

Of the oil pockets 25, each of those which are arranged close to the opposite end portions in the sliding direction of each sliding surface 22 has its second supply hole 27 formed at a position therein closer to a mid portion of the sliding surface 22 in the sliding direction thereof.

As shown in FIG. 2(D) in a further enlarged scale, each oil pocket 25 takes a straight slant shape in the cross-section of each of four lateral walls which connect peripheral edges of each oil pocket 25 on the sliding surface 22 with the bottom surface of the oil pocket 25. The shape of each lateral wall is set so that the ratio of the dimension h2 to the dimension h1 shown in FIG. 3 is within the range of h2/h1=1.5 to 2, and makes the lubrication oil at the contact surface area tend to be retained in the oil pocket 25.

The shape and dimension of each oil pocket 25 can be properly set in dependence on the dimension of each sliding surface 22. For instance, each oil pocket 25 in this particular embodiment is designed to be 50 to 60 millimeter long, 120 to 130 millimeter wide and 1 to 1.2 millimeter deep. Although the oil pockets 25 are exemplified to be of a square or rectangular shape in this particular embodiment, they may take the shape of an elongated circle, elliptical circle, true circle or the like in which a lateral wall extends continuously over the whole circumferential length.

A symbol 28 in FIG. 2(D) denotes a friction reducing layer attached on each sliding surface 22, and the friction reducing layer 28 is made of a low friction resistance resin such as, for example, polytetrafluoroethene (PTFE) or the like. For instance, in this particular embodiment, a material commercially available and known as Turcite® or Bearee® is employed as the friction reducing layer 28.

Further, although not shown, the slide guiding device 13 is provided with an oil supply device as oil supply facility which is composed of a reservoir for storing lubrication oil, a supply conduit connecting the reservoir with the first supply hole 23 and the second supply hole 27, supply means having at least one of a shutoff valve and a pump arranged at a mid portion of the supply conduit, and control means for controlling the supply means. The supply means is controlled by the control means of the oil supply device, so that respective predetermined quantities of lubrication oil are supplied from the first supply hole 23 and the second supply hole 27 at a predetermined time interval. In this particular instance, the supply of the lubrication oil is performed at about a sixteen-minute interval.

(Operation)

Next, the operation of the slide guiding device 13 (16) in the present embodiment will be described hereinafter. The slide guiding device 13 in the present embodiment is provided for guiding the column 12 mounted on the bed 11 in the X-axis direction. When given a drive power from drive means (not shown), the sliding surfaces 22 of the column 12 in contact with the slide guiding surfaces 21 of the bed 11 are slidably moved on the slide guiding surfaces 21.

At this time, the lubrication oil from the oil supply device (not shown) is supplied to contact surface areas between the slide guiding surfaces 21 and the sliding surfaces 22 through the first supply holes 23 of the oil grooves 24 and the second supply holes 27 of the oil pockets 25, and the supplied lubrication oil works to decrease the friction resistance at the contact surface areas.

The lubrication oil supplied to each contact surface area is supplied to the whole parts of the contact surface area through the sliding movement of the sliding surface 22 on the slide guiding surface 21. A part of the supplied lubrication oil flows out of the slide guiding surface 21 and the sliding surface 22, whereas the reaming part of the supplied lubrication oil is retained in the oil pockets 25 which are formed independently of the oil grooves 24.

Since each lateral wall of each oil pocket 25 takes a slant shape having a predetermined slope or gradient which is defined by the ratio h2/h1, the lubrication oil at the contact area is easily led into the oil pockets 25 to be retained therein when flown upon the sliding movement of the sliding surface 22. When the sliding movement of each sliding surface 22 acts to involve the air (i.e., the atmospheric air) into each oil pocket 25, the air is speedily discharged from each oil pocket 25 through the discharge hole 26, whereby the lubrication oil is retained reliably in each oil pocket 25.

The lubrication oil at each contact surface area flows out with the sliding movement of each sliding surface 22 as well as with the passage of time. In place of the flowing-out lubrication oil, the lubrication oil retained in each oil pocket 25 is supplied to the contact surface area, so that lubrication can be maintained until the lubrication oil all flows out. Further, since the oil pocket 25 is also provided close to each end portion of the sliding surface 22, the lubrication oil is supplied from the oil pocket 25 to the vicinity of each end portion where the lack of the lubrication oil is liable to occur, whereby the occurrence of the lack of the lubrication oil can be suppressed.

Figure 6:
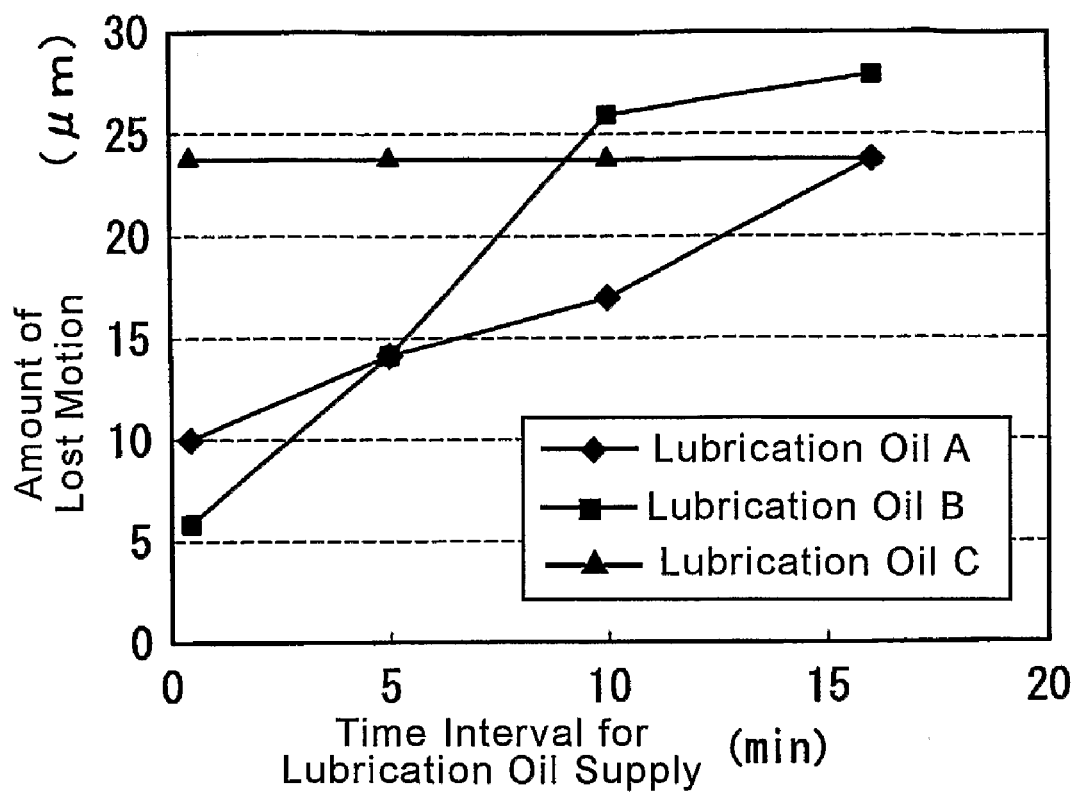
FIG. 6 is a graph showing variations of lost motion relative to the time interval for lubrication oil supply in dependence on the difference in kind of lubrication oils.

Subsequently, by the time when the lubrication oil retained in each oil pocket 25 is lost, to be more exact, when about sixteen minutes have passed after a preceding supply, additional lubrication oil of the predetermined quantity is supplied from the oil supply device to each oil pocket 25 to maintain the lubrication operation. In the case of the sixteen-minute supply interval, the aforementioned conventional slide guiding device had the lost motion of about 24 to 28 μm (micron meters) as shown in FIG. 6, whereas the slide guiding device 13 in the present embodiment could substantially reduce its lost motion to about 8 μm thereby to achieve a high feed precision.

As described above, according to the slide guiding device 13 (16) in the present embodiment, the lubrication oil retained in each oil pocket 25 is supplied to the contact surface areas between the slide guiding surfaces 21 and the sliding surfaces 22, and the occurrence of the lack of the lubrication oil is suppressed even where the time interval at which the lubrication oil is supplied to the oil grooves 24 is lengthened. Thus, it can be realized to keep the amount of the lost motion to a desired proper amount, and hence, it can also be realized to suppress the deterioration in feed accuracy and the occurrence of excessive abrasion or wear on the slide guiding surfaces 21 and the sliding surfaces 22.

Further, since the time interval at which the lubrication oil is supplied to the oil grooves 24 can be set to be long, it can be realized to reduce the running cost for lubrication.

In addition, without making a skilled worker do a scraper finishing and only by forming the oil grooves and the oil pockets by machining, it becomes possible to maintain the lubrication oil for a long time interval. Therefore, the manual work of any skilled worker is not needed, and this advantageously results in substantial reduction of the man-hour and cost for machining.

Although description has been made taking as example the foregoing preferred embodiment for practicing the present invention, the same is not limited to the foregoing embodiment. As described hereinafter, various improvements or alterations in design may be made insofar as they do not depart from the gist of the present invention.

Figure 4:
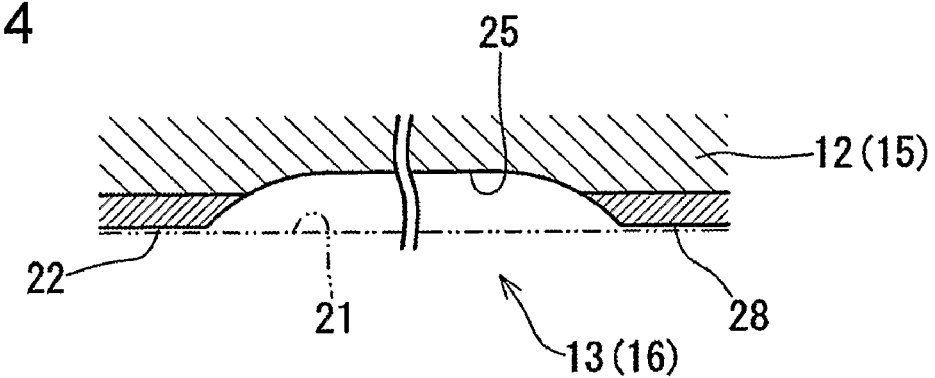
FIG. 4 is an enlarged sectional view showing another form of the lateral wall shape which is taken by the oil pocket provided in the present invention.

That is, while in the slide guiding device 13 (16) in the present embodiment, each of the oil pockets 25 is shown as that having the lateral wall inclined to extend like a straight line, the shape of the lateral wall is not limited to this shape. For example, as shown in FIG. 4, the shape of the lateral wall may take an arc shape in cross-section. The same effects as described above can be attained also in this modified form. In addition to this, since the oil pockets 25 can be easily machined with a cylindrical cutting tool or the like, it can be realized to reduce the cost involved in forming the oil pockets 25.

Figure 5:
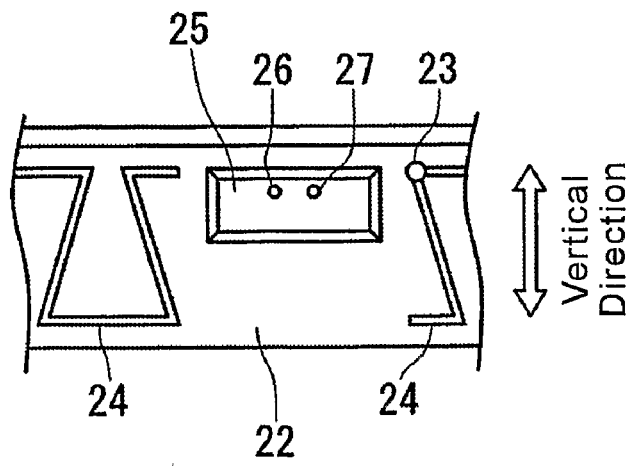
FIG. 5 is an explanatory view showing a desirable arrangement of the oil pocket where the slide guiding surface and the sliding surface are provided to lie in a slant or vertical plane.

In the slide guiding device 13 (16) in the present embodiment, each slide guiding surface 21 and the mating sliding surface 22 are arranged in an approximately horizontal plane with the sliding surface 22 mounted over the slide guiding surface 21. However, without being limited to this arrangement, the present invention may take a construction that each slide guiding surface 21 and the mating sliding surface 22 are placed upside down or another construction that each slide guiding surface 21 and the mating sliding surface 22 lie in an approximately vertical plane or in a slant plane. In this modified case, it is desirable that in addition to the oil pocket 25 provided close to each end portion of the sliding surface 22, an additional oil pocket 15 is arranged close to an upper end portion of the sliding surface 22, as shown in FIG. 5. Since the lubrication oil flows down by its gravity, the lubrication can be maintained for a longer time by retaining the lubrication oil at a position as high as possible.

Further, although in the foregoing embodiment, the slide guiding device 13 (16) is exemplified to be of the construction that each sliding surface 22 has formed thereon the oil grooves 24, the oil pockets 25 and the discharge holes 26 serving as air discharge means, the slide guiding device 13 (16) is not limited to this construction, and each sliding surface 22 may be practiced to be provided thereon with at least one of these.

Further, although in the foregoing embodiment, the slide guiding device 13 (16) is exemplified to be of the construction that the time interval for lubrication oil supply is lengthened, the slide guiding device 13 (16) is not limited to this construction. A setting may be done to decrease the supply quantity of the lubrication oil where the time interval for lubrication oil supply is set not to be so long. The same effects as described above can also be attained in this case.

Furthermore, although in the foregoing embodiment, the slide guiding device 13 (16) is exemplified to be that which is applied to a machining center as machine tool 10, it is not limited to the use in the machining center. Rather, it may be applicable to other types of machine tools such as for example, grinding machine, lathe, milling machine and the like.

Moreover, although in the foregoing embodiment, the slide guiding device 13 (16) is exemplified as having a pair of slide guiding surfaces 21, 21 and a pair of sliding surfaces 22, 22, it may be constructed to have a single slide guiding surface 21 and a single sliding surface 22 mating therewith.

INDUSTRIAL APPLICABILITY

As described above, the slide guiding device according to the present invention is useful as a slide guiding system employed in the field of machine tools for processing (machining or grinding) workpieces at a high precision and a high speed. Slide guiding systems employed in machine tools are required to be of less friction wear for a long service life as well as to be of little consumption of lubrication oil in avoiding the environmental pollution. The slide guiding device according to the present invention is originated for the purpose of satisfying these requirements which have been long-felt but unsolved in the machine tool filed.

The invention claimed is:

1. A slide guiding device comprising:
   a slide guiding surface provided on a support member;
   a sliding surface provided on a movable slide, which is guided on the slide guiding surface for movement thereon, and slidably movable on the slide guiding surface;
   a plurality of oil grooves, each with a first supply hole for supplying lubrication oil to a contact surface area between the sliding surface and the slide guiding surface;
   an oil pocket formed independently of the oil groove for retaining the lubrication oil supplied to the contact surface area between the sliding surface and the slide guiding surface, the oil pocket provided with a second supply hole for supplying the lubrication oil into the oil pocket, and
   air discharge means for discharging air from the oil pocket, wherein said oil grooves are independently arranged in a sliding direction.

2. The slide guiding device as set forth in claim 1, wherein the oil pocket is provided close to an end portion of the contact surface area between the sliding surface and the slide guiding surface.

3. The slide guiding device as set forth in claim 2, wherein the oil groove, the oil pocket and the air discharge means are provided on the sliding surface.

4. The slide guiding device as set forth in claim 1, wherein the oil groove, the oil pocket and the air discharge means are provided on the sliding surface.

5. A slide guiding device comprising:
   a slide guiding surface provided on a support member;
   a sliding surface provided on a movable slide, which is guided on the slide guiding surface for movement thereon, and slidably movable on the slide guiding surface;
   an oil groove with a first supply hole for supplying lubrication oil to a contact surface area between the sliding surface and the slide guiding surface;
   an oil pocket formed independently of the oil groove for retaining the lubrication oil supplied to the contact surface area between the sliding surface and the slide guiding surface, wherein the oil pocket is provided with a second supply hole for supplying the lubrication oil into the oil pocket, and
   air discharge means for discharging air from the oil pocket.

6. The slide guiding device as set forth in claim 5, wherein the oil pocket is provided close to an end portion of the contact surface area between the sliding surface and the slide guiding surface.

7. The slide guiding device as set forth in claim 5, wherein the oil groove, the oil pocket and the air discharge means are provided on the sliding surface.

8. The slide guiding device as set forth in claim 5, wherein the oil pocket is provided close to an end portion of the contact surface area between the sliding surface and the slide guiding surface.

* * * * *